United States Patent
Witzig et al.

[11] 3,838,938
[45] Oct. 1, 1974

[54] MACHINE TOOL WITH RADIALLY PROJECTING ARM, PARTICULARLY VERTICAL BORING MACHINE

[76] Inventors: Emil Karl Witzig; Rudolf Frank, both of Romerstrasse 66-68, 725 Leonberg, Germany

[22] Filed: Mar. 5, 1973

[21] Appl. No.: 338,310

[52] U.S. Cl................ 408/237, 29/1 A, 188/67, 188/367
[51] Int. Cl................ B23b 39/12, B23q 1/28
[58] Field of Search............ 29/1 A; 408/236, 237; 188/367, 67

[56] References Cited
UNITED STATES PATENTS

| | | | |
|---|---|---|---|
| 2,945,402 | 7/1960 | Burg | 408/237 |
| 3,695,144 | 10/1972 | Goiffon et al. | 188/67 |
| 3,741,674 | 6/1973 | Witzig et al. | 408/237 |

FOREIGN PATENTS OR APPLICATIONS

| 616,799 | 1/1949 | Great Britain | 408/236 |
|---|---|---|---|

Primary Examiner—Francis S. Husar
Attorney, Agent, or Firm—Flynn & Frishauf

[57] ABSTRACT

A carriage assembly is fixed to a vertical column, the arm being movable in the carriage assembly. To lock the carriage assembly with respect to the column immovably fixed against rotation, the carriage assembly has a pin penetrating into the column secured on bearings. Circumferentially, a clamping surface is formed on the column, or secured thereto, and an opposed clamping surface formed on the pin, or secured thereto, one of the clamping surfaces being a resiliently movable wall behind which a pressure fluid, such as compressed oil, can be introduced. Upon resilient deformation of the resiliently movable element, the two surfaces will engage and prevent angular displacement of the arm supporting carriage with respect to the column.

7 Claims, 3 Drawing Figures

3,838,938

MACHINE TOOL WITH RADIALLY PROJECTING ARM, PARTICULARLY VERTICAL BORING MACHINE

Cross reference to related applications: U.S. Ser. No. 177,381, filed Sept. 2, 1971, now U.S. Pat. No. 3,771,896 U.S. Ser. No. 177,310, filed Sept. 2, 1971, now U.S. Pat. No. 3,741,614.

The present invention relates to machine tools, and more particularly to machine tools in which a radially projecting arm carries a tool head, for example a radial boring machine. The present invention is directed to an improvement in the type of boring machine shown and described in U.S. Pat. No. 3,771,896, by the inventors hereof.

The machine tool of the above referred to prior application has a hollow column which supports a roller assembly in which an outrigger, or projecting arm is movably guided. The connection between the arm and the column includes a bearing pin, and bearings to support the arm within the column, as well as locks in order to lock the arm with respect to the column in a predetermined position. Machine tools, and particularly radial boring machines as described in the aforementioned application have the advantage that the column which supports the bearing assembly, and the roller arrangement for the arm can be designed to meet the design requirements of the column, and may be made of such diameter that the stability of the entire arrangement is satisfactorily met. Interconnection between the outrigger arm and the column can be positive, without play, and permitting strong clamping engagement to meet operating requirements, and resist vibration and shock, during operation of the boring machine.

It is an object of the present invention to improve the boring machine disclosed in the aforementioned application, and more particularly to provide an improved lock to fix the roller carriage for the arm with respect to the column in a simple and reliable manner while permitting free swinging movement of the arm about the column when the lock between arm and column, or roller carriage supporting the arm, and the column, respectively, is released.

SUBJECT MATTER OF THE PRESENT INVENTION

Briefly, a clamping surface, coaxial to the column, is rigidly connected with either the column part, or the roller carriage part. Facing this surface is a coaxially located, elastically deformable surface secured to the other part (the carriage part or the column part, respectively). The elastically deformable surface defines, with its part against which it is located, a sealed space, into which a pressure fluid, for example pressure oil, compressed air, or the like can be introduced, in order to deform the elastic wall and press it securely against the facing surface. Introduction of a pressure fluid provides for smooth continuous clamping action of the elastic wall surface against the fixed wall surface.

Upon release of the pressure fluid, that is, when the elastically deformable wall section defining the space behind it is not under pressure, it is easily possible to swing the roller assembly or carriage with respect to the column. The elastically deformable wall is so located that there is a slight distance, or clearance to the cooperating, oppositely faced clamping surface. Upon introduction of pressure fluid, the elastic wall surface will deform uniformly and fit smoothly throughout its circumference against the matching clamping surface, so that the roller carriage, and with it the projecting outrigger arm is exactly located in angular position with respect to the column. Introducing the pressure fluid does not introduce any torque, so that a previously exactly aligned position of the arm, with respect to the column, is not disturbed. The elastic deformation of the elastically deformable wall with respect to the clamping surface permits transmission of substantial forces, since the area of the elastically deformable wall fitting the opposed clamping surface is substantial, and frictional engagement between the walls extends over the entire circumference of the walls.

The invention will be described by way of example with reference to the accompanying drawings, wherein.

Figure 1:
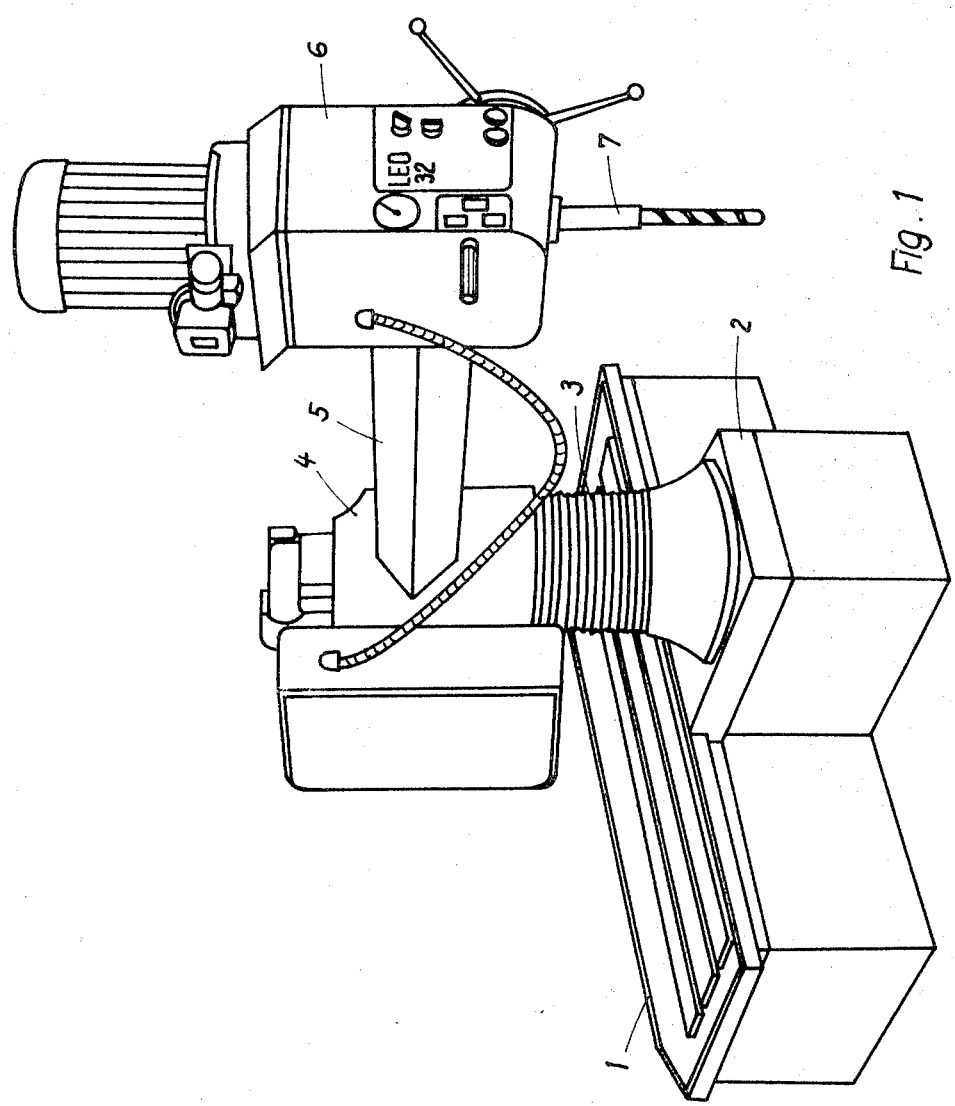
FIG. 1 is a perspective schematic view of a radial boring machine in which the present invention is used.

The radial boring machine of FIG. 1 has a work table 1, to which a base 2 is connected, in which a column 8 is vertically movably located, protected against contamination by a bellows 3. The column carries a roller carriage 4 in which an outrigger arm 5 is horizontally movably located. The far end of arm 5 carries a machine tool head 6 including a motor, drive spindle and the like, for example a boring tool 7. Feed components, adjustments, and the like are located within the machine tool head 6, as well known in the art.

Figure 2:
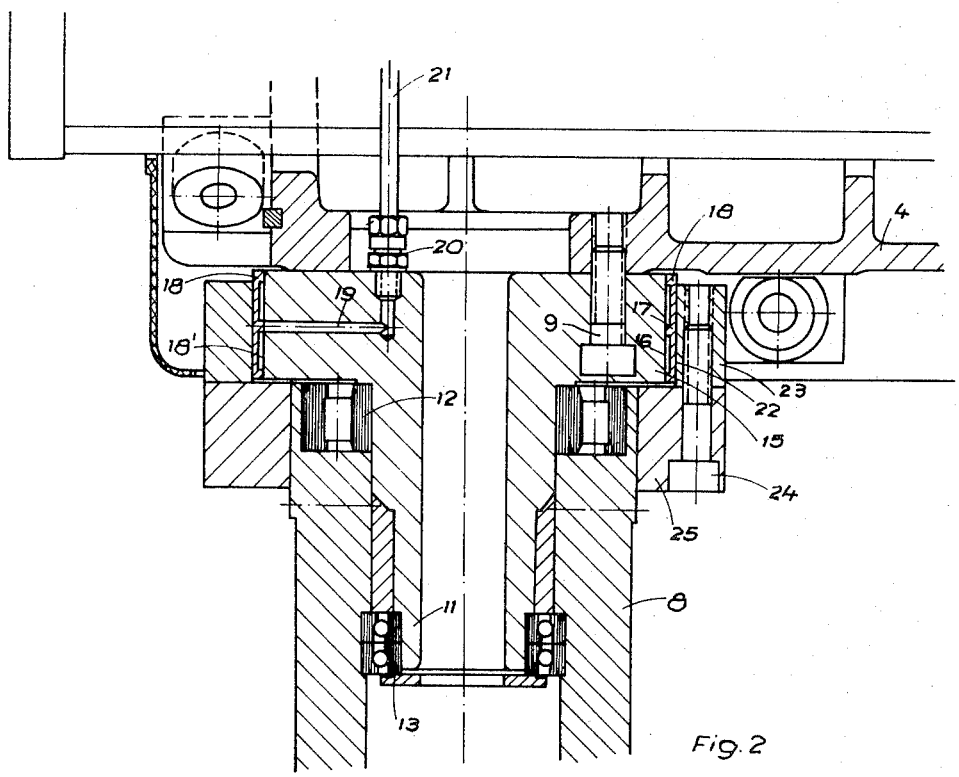
FIG. 2 is a longitudinal section view through the roller carriage and the column, illustrating, schematically, the bearing arrangement of the boring machine of FIG. 1, with parts broken away, and to a greatly enlarged scale with respect to FIG. 1.

Bellows 3 protects column 8 (FIG. 2). Column 8 is a cylindrical hollow column. Roller carriage 4 is secured by means of screws 9 and suitable locating pins to a central cylindrical bearing pin 11 which extends into column 8. Bearing pin 11 is journalled within the column to permit swinging of the roller carriage 4, and with it of arm 5 with respect to the column which is radially fixed. Bearing pin 11 is journalled in column 8 by means of an upper neck journal bearing 12 and a lower bearing 13. These bearings provide for radial guidance of the bearing pin, the lower bearing 13 simultaneously providing thrust bearing function.

Bearing pin 11 has a unitary projecting flange 15, fitting over column 8. It is formed with a cylindrical surface 16 at its circumference. The cylindrical surface 16 has an elastically deformable cylindrical wall 17 applied thereto. Cylindrical wall 17 is formed with ring-shaped internal ridges 18, tightly fitting against the cylindrical surface 16. The ridges 18, together with surface 16, form a seal, and space the inner surface of the wall 17 from the surface 16 by a slight distance, to form a ring-shaped sealed hollow space 18'. Bore 19, located in flange 15, terminates in this hollow space. Bore 19 is connected to a pressure line 21 by means of a connection fitting 20. The hollow space 18 and bore 19, as well as line 21, are connected to a source of pressure medium, for example oil, brake fluid or the like, which can be placed under pressure by means of a hydraulic pressure pump, not shown, and selectively connectable to line 21.

The outer surface of wall 17 faces a coaxial cylindrical clamping surface 22, spaced by a slight distance. Surface 22 is formed on the inside of a ring 23 which is connected by means of screws 24 with a flange 25. Flange 25 is welded to the outer wall surface of column 8.

OPERATION

The roller assembly 4, and with it arm 5, are freely rotatable about the column 8, by rotation of pin 11 in the bearings 12, 13, provided that no pressure medium is introduced into the hollow space 18', so that the elastically deformable wall 17 will be spaced by a slight distance from the opposed clamping surface 22. If the roller assembly 4, and with it arm 5, are to be radially fixed with respect to column 8, pressure fluid is introduced in the hollow space 18' by connecting line 21 to a source of pressure, and introducing the pressure fluid through duct 19. The elastically deformable wall 17 is radially extended outwardly, and will fit smoothly, throughout its circumference on the facing clamping surface 22, providing fixed connection between the bearing pin 11 and ring 23, and thus with column 8.

In the illustrated example, the elastically deformable wall 17 is connected to bearing pin 11, and clamping surface 22 is rigidly associated with column 8. It is equally possible to reverse the arrangement, that is, to attach the elastically deformable wall 17 to the column 8, and to form the associated matching fitting clamping surface on a part or portion attached to the roller assembly 4.

Figure 2A:
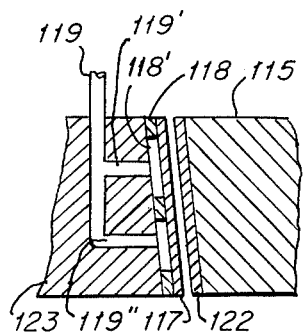
FIG. 2a is a fragmentary detail view of another embodiment of the engagement surfaces.

In the example shown in FIG. 2, the elastically deformable wall as well as the clamping surface were cylindrical. FIG. 2a illustrates a conical clamping surface 122, formed of a friction liner attached to flange 115, similar to flange 15 of FIG. 2. Facing surface 122 is an elastically deformable wall 117, spaced from flange 123 (corresponding to flange 23 of FIG. 2) by a plurality of ring ridges 118. Pressure line 119, branching into branch lines 119' and 119'' introduces pressure fluid in the space 117' beneath the elastically deformable wall portion, and drains pressure fluid therefrom. FIG. 2a additionally shows connection of the deformable wall to the elements secured to the column, and the fixed wall to the elements secured to the movable roller assembly 4.

Various changes and modifications may be made within the inventive concept, and the embodiments described and shown in any one of the drawings may be used with any other embodiments, within the inventive concept.

We claim:

1. Machine tool having a vertical, cylindrical hollow column part (8), a radially projecting arm (5) and a connecting part (4) connecting the arm and the column part for sliding movement of the arm (5) with respect to the column part, said connecting part including a pin (11) extending within the column; bearing means (12, 13) including a thrust bearing (13) swingably guiding the pin (11) in the column (8) and supporting the connecting part (4) in vertically fixed position on the column part (8);

and means securing the pin (11) to the column (8) in radially fixed position comprising a fixed clamping surface (22, 122) secured to one of said parts and located coaxially with respect to the column part (8);

an elastically deformable wall (17, 117) located on the other part (4, 11) coaxially with respect to the column part and facing said fixed clamping surface (22, 122);

means (19, 20, 21; 119, 119', 119'') to introduce pressure fluid through said other part behind the elastically deformable wall (17, 117) to elastically deform said wall upon introduction of pressure fluid between said other part and wall and press the outer surface of said deformable wall against the fixed clamping surface;

the clamping surface (22, 122) and the deformable wall (17, 117), both, being endless ring-shaped and surrounding the axis of the column to provide for uniform circumferential engagement of the deformable wall with the clamping surface upon introduction of pressure fluid; and means (18, 118) formed on the deformable wall (17, 117) and facing said other part to form a space between the inner face of the wall and the other part and to seal said wall, fluid-tight, against said other part, the fluid pressure introducing means (19, 119) terminating in said space (18', 118').

2. Machine tool according to claim 1, comprising a flange (15) secured to the bearing pin (11);

a ring (23) secured to the column part in axial alignment with the flange (15) and having an inner surface facing the flange, said clamping surface and said wall being secured, one each, to the flange (15) and to the inner surface of the ring (23).

3. Machine tool according to claim 2, wherein the flange (15) projects radially over the column part (8) and the ring (23) is secured to the outer surface of the cylindrical column.

4. Machine tool according to claim 1 (FIG. 2) wherein the clamping surface (22) and the wall (17) are cylindrical.

5. Machine tool according to claim 1 (FIG. 2a) wherein the clamping surface (122) and the wall (117) are conical.

6. Machine tool according to claim 1 (FIG. 2) wherein the clamping surface (22) is secured to the column part (8, 23) and the deformable wall (17) is secured to the connecting part (4, 15).

7. Machine tool according to claim 1 (FIG. 2a) wherein the clamping surface (122) is secured to the connecting part (4, 115) and the deformable wall (117) is secured to the column part (8, 123).

* * * * *